Figure 1:
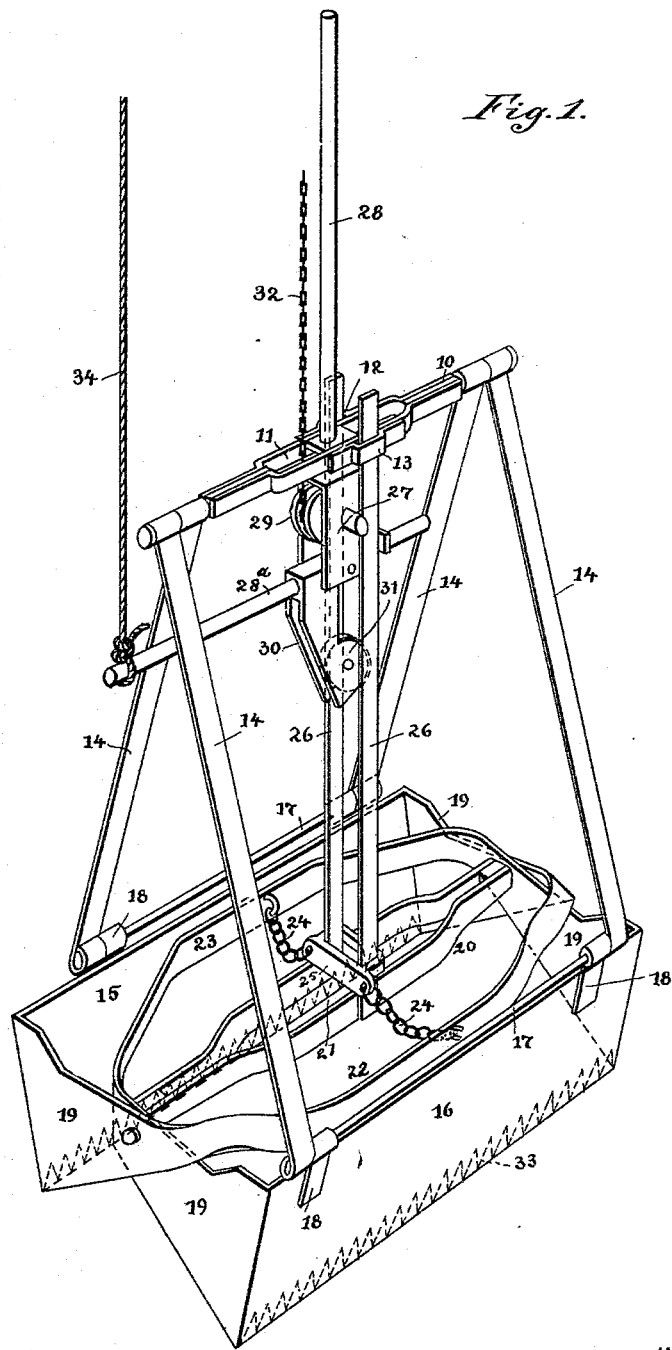

(No Model.) 2 Sheets—Sheet 1.

R. HOSFORD.
DREDGING BUCKET.

No. 401,436. Patented Apr. 16, 1889.

WITNESSES:
D. C. Reusch.
C. Sedgwick.

INVENTOR:
R. Hosford
BY Munn & Co.
ATTORNEYS.

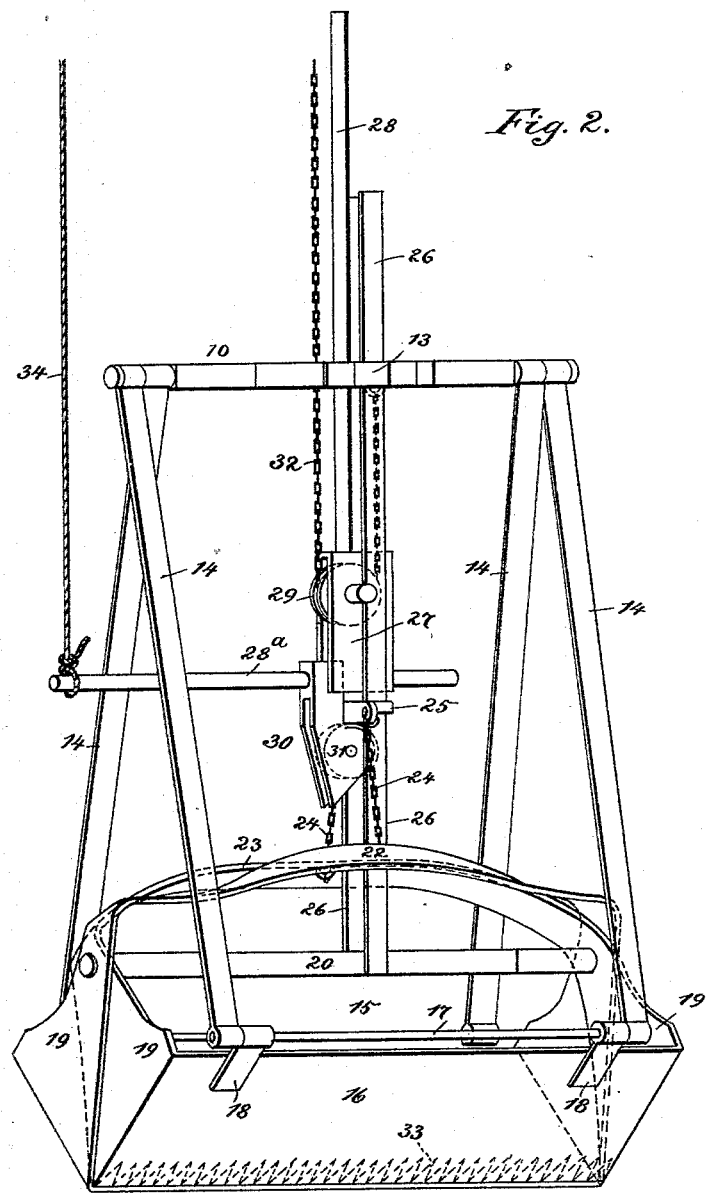

UNITED STATES PATENT OFFICE.

REZIN HOSFORD, OF LEBANON, INDIANA.

DREDGING-BUCKET.

SPECIFICATION forming part of Letters Patent No. 401,436, dated April 16, 1889.

Application filed September 26, 1888. Serial No. 286,432. (No model.)

*To all whom it may concern:*

Be it known that I, REZIN HOSFORD, of Lebanon, in the county of Boone and State of Indiana, have invented a new and Improved Dredging-Bucket, of which the following is a full, clear, and exact description.

My invention relates to an improvement in dredging-buckets, and has for its object to provide an implement of simple and durable construction, capable of convenient manipulation, and adapted for removing material from the bed of the sea or a river; and a further object of the invention is to provide an implement which may be employed for dredging oysters, gravel, sand, or mud, and wherein the jaws of the bucket may be closed prior to being lifted.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in both the views.

Figure 1 is a perspective view of the bucket with the jaws or shovels opened in position for lowering; and Fig. 2 is a similar view, the jaws or shovels being closed and in position for raising.

In carrying out the invention the frame of the implement consists of a head, 10, provided with an elongated aperture, 11, in the center and a loop, 12 and 13, at each side of the said aperture. Upon each extremity of the head two arms, 14, are pivoted, each set of which arms extend downward and outward in opposite directions.

To each of the arms 14, at one side of the head, a shovel-blade (respectively designated 15 and 16) is hinged in any approved manner, the connection being usually effected by a pintle, 17, secured to said arms, passing through knuckles 18, riveted or otherwise attached to the upper longitudinal edge of the shovels.

The shovels are each provided at the extremities with end projections or ears, 19, which ears, extending inward at a right angle to the body, overlap the ears of the opposing shovel, and are pivotally united by base-bar 20, having a central elongated aperture, 21, which base-bar extends longitudinally of the bucket formed by the union of the two shovels.

To each of the shovels 15 and 16 a yoke, 22 and 23, is respectively attached, the yoke 22 being attached to the outer face of the side ears of the shovel 15 or formed integral therewith, and the body of the yoke, projecting inward over the said ears, is bowed to closely approach at the center the inner face of the shovel 16. The yoke 22, when not formed integral with the ears 19, is also apertured to receive the trunnions of the base-bar 20.

The yoke 23 is secured to the inner face of the side projections or ears of the shovel 16, or formed integral therewith, and is also apertured when not integral to receive the trunnions of the base-bar 20. The body of the said yoke is curved or bowed to essentially engage with the inner face of the shovel 15. The practical engagement of the yokes with the shovels is only effected when the same are opened or assume substantially a perpendicular position, as shown in Fig. 1. The yokes 22 and 23 are centrally connected by a chain, 24, provided with a large guide-link, 25, resting upon the base-bar 20 and spanning the aperture 21 therein, as best shown in Fig. 2.

From each side of the base-bar at the center parallel guide-rods 26 are projected, which, passing through the guide-link 25, extend upward through the side loops, 12 and 13, of the head, as is also best illustrated in Fig. 2.

An essentially inverted-U-shaped carriage, 27, is held to slide between the guide-rods 26 in any approved manner, having attached to the top or bowed end of the carriage a rod, 28, projecting upward any suitable distance, passing through and guided in the elongated head-aperture.

In the carriage below the upper end a groove-pulley, 29, is journaled, and a trip-bar, 28ª, is fulcrumed in the lower end of the said carriage, extending, preferably, a greater distance beyond one side than the other, the fulcrum being at one side the center of the carriage in direction of the short arm of the bar.

Upon the long arm of the trip-bar, partially within and outside of the carriage, a perpendicular downwardly-extending latch, 30, is secured, provided with a friction-roller, 31, which latch is adapted for engagement with one side of the link 25, as shown in Fig. 1.

A chain, 32, is attached to the under side of the head 10, which chain passes down around the grooved pulley of carriage 29 and upward through the elongated aperture in the head, terminating at or near the end of the manipulating-rod 28.

When the dredger is used for oyster-fishing, the lower edge of the shovels is provided with a series of teeth, 33, as shown in dotted lines. The trip-bar is operated from above by means of a rope, 34, secured to the long arm thereof.

In operation, when the bucket is thrown overboard, the jaws or shovels are opened and the carriage drawn upward to the head. After having been manipulated by the rod 28 the chain 32 is loosened and the carriage allowed to drop, whereupon the latch 30 catches beneath the link 25. Thus just before the bucket is drawn up the chain 32, being drawn, raises the yokes and causes the bottom edge of the shovels to come in contact and form a bucket; or the same result may be accomplished by drawing upward the rod 28. Thus before the bucket is raised from the ground it is closed. To release the latch from the link 25 after the bucket is raised to spill the contents, the trip-rod 28 is elevated by means of the rope 34.

Having thus described my invention, what I claim as new, and desire to secure by Letters Patent, is—

1. The combination, with a frame and shovels pivoted to said frame and to each other, of yokes oppositely curved, secured to the shovels, a link connecting said yokes, and a vertically-reciprocating latch engaging said link, substantially as shown and described.

2. The combination, with a frame and shovels pivoted to said frame and to each other, of yokes oppositely curved, secured to the shovels, a link connecting said yokes, a vertically-reciprocating carriage, a latch pivoted in the carriage, engaging the link, and means, substantially as described, for manipulating said carriage, as and for the purpose specified.

3. The combination, with a frame, shovels pivoted to said frame and to each other, and yokes oppositely secured to the shovels, of a link connecting the yokes, a vertically-reciprocating carriage provided with a grooved pulley, a counterbalanced latch pivoted in the carriage, and a chain attached to the frame, passing over the carriage-pulley and upward beyond the frame, substantially as shown and described.

4. The combination, with a frame, shovels pivoted to said frame and to each other, yokes oppositely secured to the shovels, and a link connecting said yokes, of a vertically-reciprocating carriage provided with a pulley, a latch pivoted in said carriage, engaging said link, a trip-bar extending an unequal distance each side of the latch, and a chain attached to the frame, passing over the carriage-pulley and upward beyond the said frame, substantially as shown and described.

5. The combination, with a frame consisting of an apertured head and downwardly-extending oppositely-disposed arms, shovels pivoted to said arms and to each other, oppositely-curved yokes secured to said shovels, a link connecting said yokes, and vertical guide-rods secured to base-bar 20, of a carriage sliding upon said guide-rods, containing a grooved pulley, a manipulating-rod integral with the top of the carriage, a latch pivoted in the lower end of the same, a trip-bar extending an unequal distance from the sides of the latch, a chain attached to the frame, passing over the carriage-pulley and upward beyond the frame, and means, substantially as described, for manipulating the trip-bar, as and for the purpose specified.

REZIN HOSFORD.

Witnesses:
FRANK P. BYNUM,
H. F. KRAMER.